United States Patent [19]

Okamoto

[11] 4,410,799

[45] Oct. 18, 1983

[54] DEVICE FOR CONTROLLING RADIATION IMAGE INFORMATION READ OUT GAIN

[75] Inventor: Yoshihiko Okamoto, Minami-ashigara, Japan

[73] Assignee: Fuji Photo Film Co., Ltd., Kanagawa, Japan

[21] Appl. No.: 281,079

[22] Filed: Jul. 7, 1981

[30] Foreign Application Priority Data

Jul. 10, 1980 [JP] Japan .................................. 55/94248

[51] Int. Cl.³ ............................ G03C 5/16; G01J 1/42
[52] U.S. Cl. ............................... 250/327.2; 250/354.1
[58] Field of Search ................ 250/327.2, 354.1, 369, 250/484.1, 214 AG; 378/95, 108, 112

[56] References Cited

U.S. PATENT DOCUMENTS

| | | | |
|---|---|---|---|
| 3,917,947 | 11/1975 | Fenton | 378/95 |
| 4,185,198 | 1/1980 | Fujimoto | 378/95 |
| 4,239,968 | 12/1980 | Kotera et al. | 250/327.2 |
| 4,258,264 | 3/1981 | Kotera et al. | 250/484.1 |
| 4,284,889 | 8/1981 | Kato et al. | 250/354.1 |
| 4,309,612 | 1/1982 | Aichinger | 378/108 |

Primary Examiner—Alfred E. Smith
Assistant Examiner—Janice A. Howell
Attorney, Agent, or Firm—Gerald J. Ferguson, Jr.; Joseph J. Baker

[57] ABSTRACT

In a radiation image information read out apparatus using a stimulable phosphor in which a radiation image is once recorded and then read out by use of stimulating rays impinging thereupon, the gain of the read out system is controlled according to a fluctuation of the intensity of the stimulating ray source by use of an additional photodetector. The read out gain is also controlled according to the radiographic conditions by means of the standard signal for setting the sensitivity level of the read out system.

5 Claims, 6 Drawing Figures

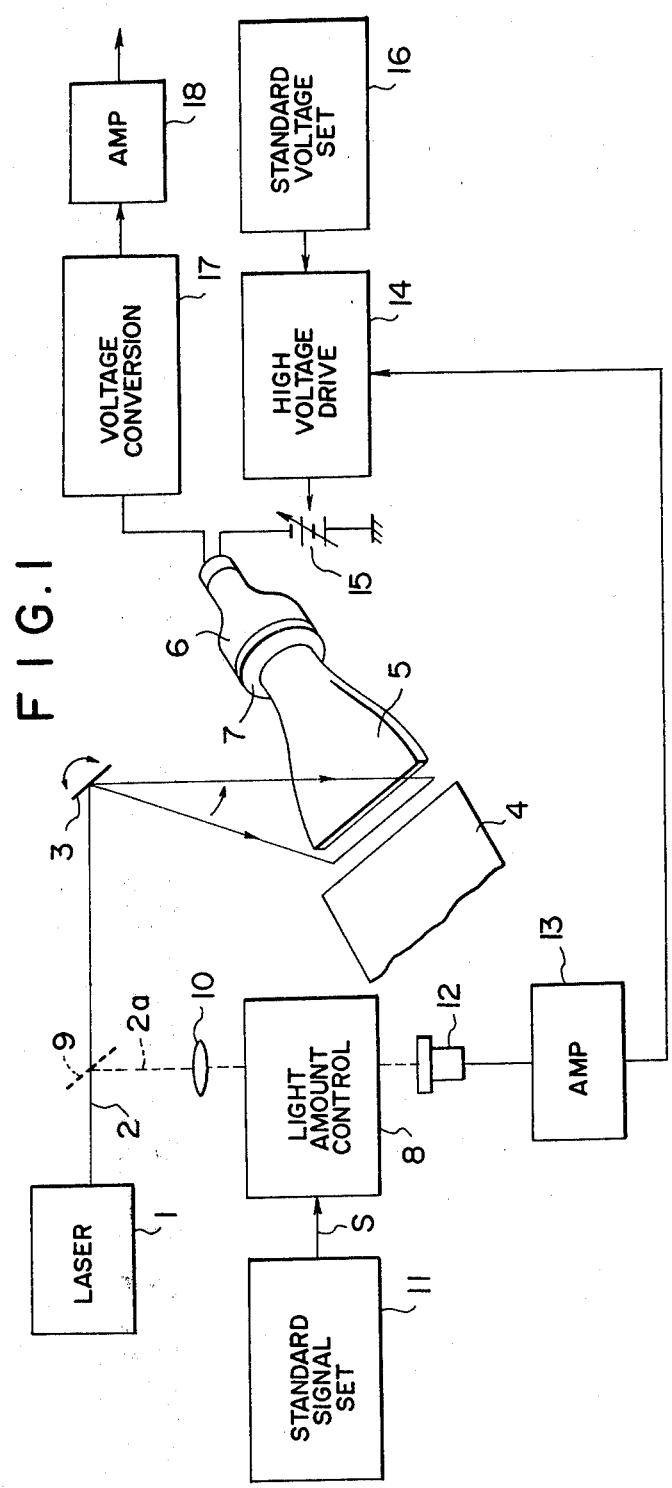
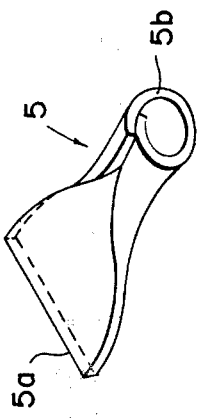

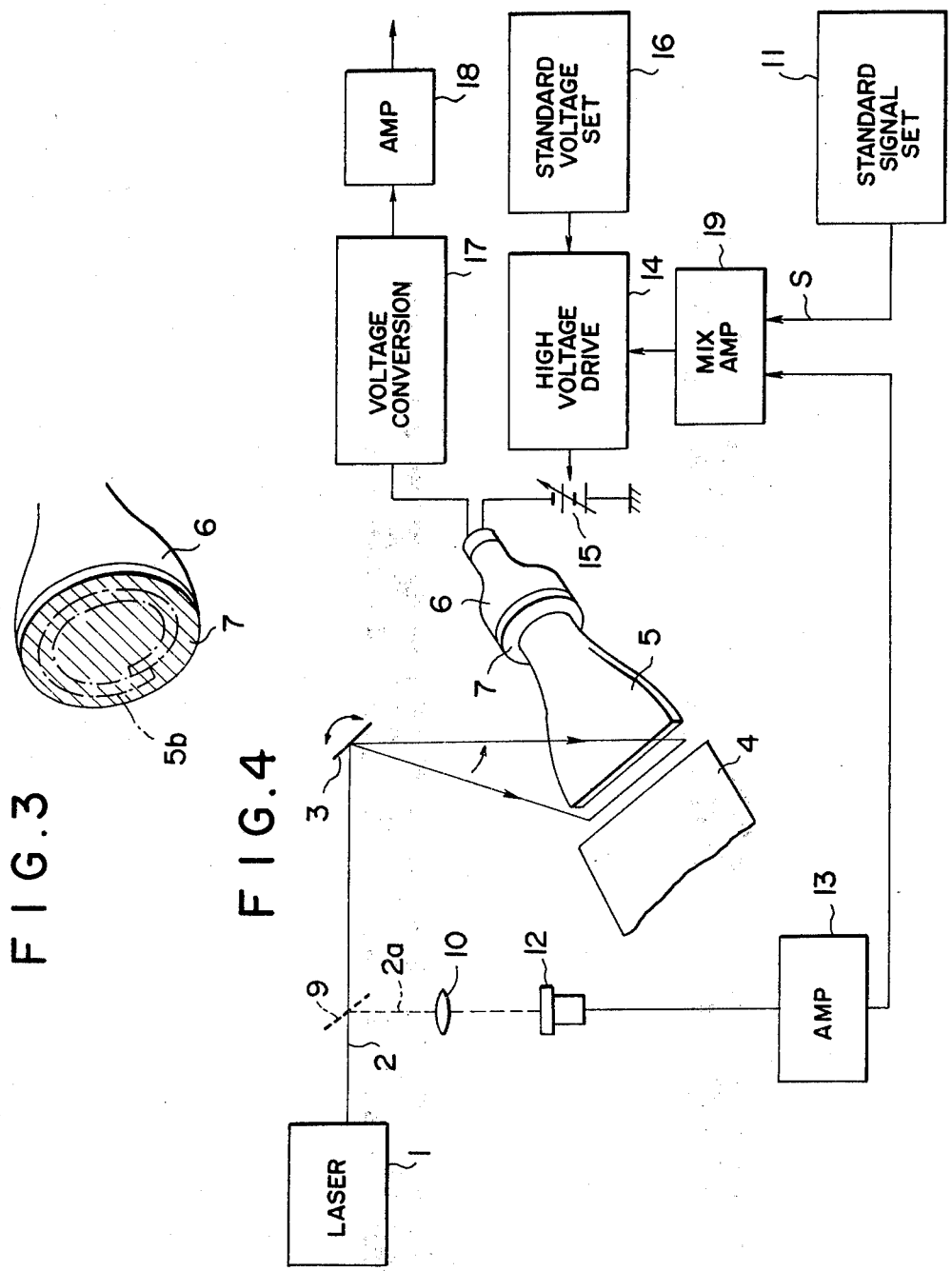

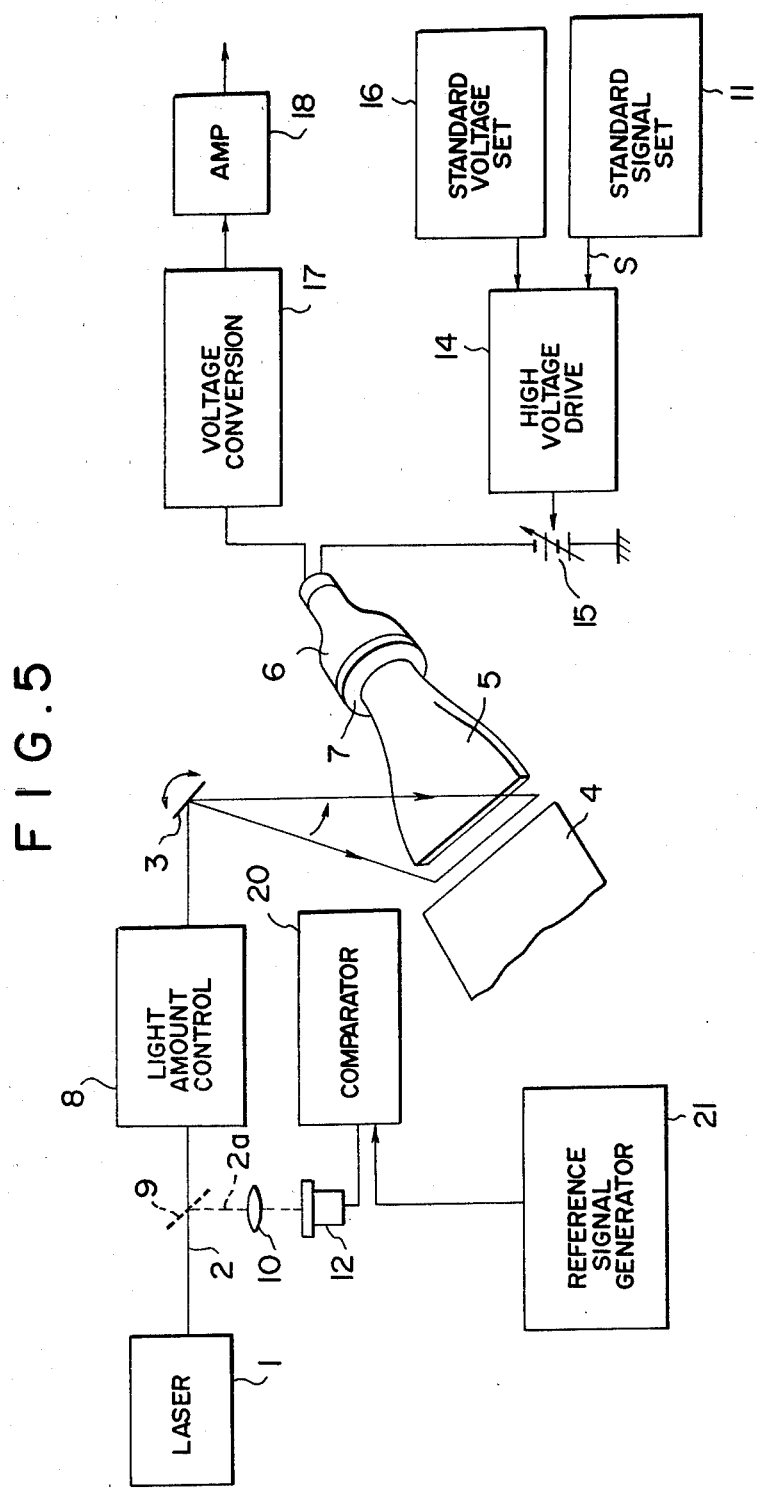

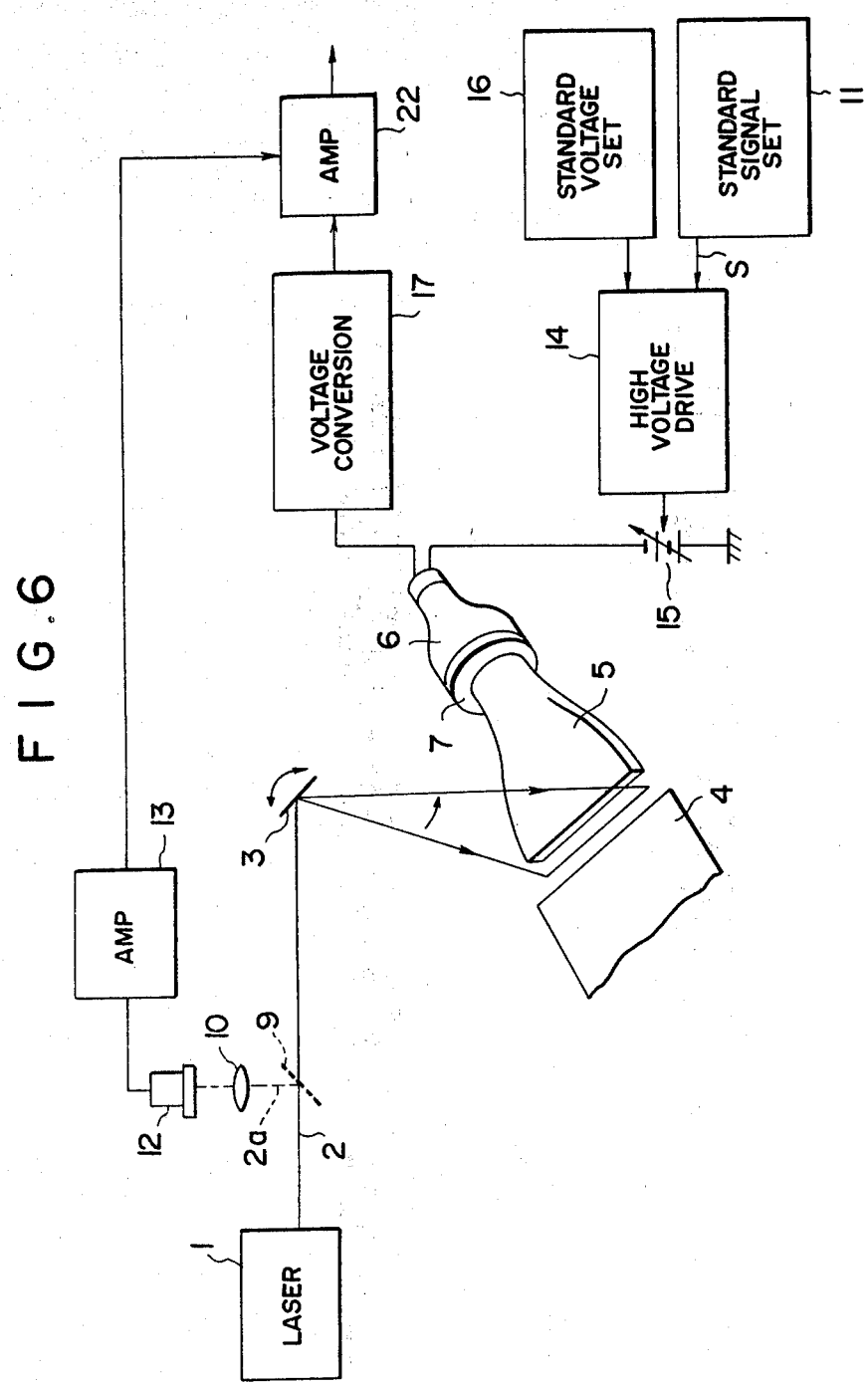

DEVICE FOR CONTROLLING RADIATION IMAGE INFORMATION READ OUT GAIN

BACKGROUND OF THE INVENTION

1. Field of the Invention

This invention relates to a radiation image information read out apparatus for scanning a stimulable phosphor plate with a light beam of stimulating rays to cause the stimulable phosphor plate carrying radiation image information to emit light according to the radiation image information stored therein so as to read out the information, and more particularly to a device for controlling the gain of the read out system according to various conditions.

2. Description of the Prior Art

A stimulable phosphor stores a part of the energy of a radiation when exposed to the radiation like X-rays, α-rays, β-rays, γ-rays and ultraviolet rays. Then, when the stimulable phosphor which has been exposed to the radiation is exposed to stimulating rays, light is emitted from the stimulable phosphor upon stimulation thereof according to the stored energy of the radiation.

An X-ray image forming system has been proposed, in which an X-ray image of a human body, etc. is once recorded in a sheet-like stimulable phosphor plate, the stimulable phosphor plate is then scanned with stimulating rays to cause the stimulable phosphor to emit light upon stimulation thereof, the light emitted is detected by a photodetector to obtain an image signal, and the image signal is used to modulate the light beam for recording the X-ray image on a recording medium such as photographic film. Such a system is disclosed, for example, in U.S. Pat. Nos. 4,258,264 and 4,239,968.

With such a conventional system, however, when the stimulable phosphor plate storing the radiation image information is scanned with a laser beam to read out the light emitted therefrom upon stimulation thereof, the intensity of light detected fluctuates largely even if the laser beam having a constant intensity is used for scanning. Thus, such a conventional system cannot provide a radiation image which is easy to observe. This is because the radiographic conditions such as exposure dose, quality of radiation and object during radiography are not always the same. If the gain of the read out system for the radiation image, such as photodetector, is fixed without being adjusted according to the radiographic conditions, the following problem arises. That is, the gain of the read out system may be adequate when reading some pieces of radiation image information. However, when reading other pieces of radiation image information, the gain will be too low and the radiation image information cannot be read out correctly due to noise.

In addition, the output of the laser source used to emit stimulating rays is unstable and the intensity thereof inevitably fluctuates about 10 to 20% with time. This fluctuation in the intensity of the stimulating rays causes the level of the light emitted from the stimulable phosphor upon stimulation thereof to fluctuate. This is because the intensity of the light emitted from the stimulable phosphor is approximately proportional to that of the stimulating rays. Thus, sections in one image, which should have the same density, are reproduced to different densities. Therefore, it is not possible to reproduce correct radiation image information.

Accordingly, in order to always achieve correct read out of the radiation image information stored in the stimulable phosphor, it is necessary to control the read out gain so that the image signal from the light detecting system is within a constant range even when the radiographic conditions such as exposure dose, quality of radiation and object are different and when the intensity of the stimulating ray source changes.

SUMMARY OF THE INVENTION

The object of the present invention is to provide a device for controlling the read out gain of a radiation image information read out apparatus, which can solve the problems described above by always controlling the read out gain of the read out system according to a change in the radiographic conditions and a fluctuation of the intensity of the stimulating ray source so as to reproduce an appropriate radiation image that is easy to observe.

The above object is accomplished by a device for controlling the read out gain according to the present invention in which a part of the stimulating rays is taken out during the read out operation and introduced into an additional photodetector that is arranged separately from the photodetector for reading out the information, the output from the second photodetector is used to adjust the read out gain during the read out step, thereby to control the read out gain according to a fluctuation of the intensity of the stimulating ray source, and the read out gain is also adjusted by means of the standard signal according to the radiographic conditions.

With the device according to the present invention, the read out gain is controlled with respect to two adjustment factors: one is fixed for the same image according to the radiographic conditions, and the other fluctuates even in the same image according to a fluctuation of the stimulating rays. In this way, the device according to the present invention can realize the image information read out of a constant output level and provide an improved and stabilized quality of reproduced images.

In the context of the present invention, "controlling the read out gain of the read out system" embraces every form of control that has influences on the final read out gain of the read out system. Thus it means every possible control items ranging from the control of the intensity of the stimulating rays to the control of the ultimate amplifier gain.

BRIEF DESCRIPTION OF THE DRAWINGS

FIGS. 1, 4, 5 and 6 are schematic views showing various embodiments of the device for controlling the radiation image information read out gain according to the present invention, FIG. 2 is a perspective view of a light guiding sheet employed in a preferred embodiment of the present invention, and FIG. 3 is a partial perspective view showing the light receiving face of photomultiplier used in a preferred embodiment of the present invention.

DESCRIPTION OF THE PREFERRED EMBODIMENTS

Now the present invention will be described in detail with reference to the drawing.

Referring to FIG. 1 showing the first embodiment of the present invention, a laser source 1 emits a laser beam 2 which has a wavelength within the range of 500 to 800 nm. In the optical path of the laser beam 2, a light deflector 3 such as galvanometer mirror is arranged to deflect the laser beam 2 in one direction. The laser beam deflected by the light deflector 3 impinges upon a stimulable phosphor plate 4 which stores a radiation image therein. The stimulable phosphor plate 4 exposed to the laser beam emits light according to the stored image, and the light emitted enters a light guiding sheet 5.

The light guiding sheet 5 has a linear light input face 5a, as shown in FIG. 2, and is located close to the scanning line on the stimulable phosphor plate 4. The light output face 5b of the light guiding sheet 5 is shaped into a ring-shaped form and put into close contact with the light receiving face of a photodetector 6 such as photomultiplier. The light guiding sheet 5 is made by processing a sheet of a transparent thermoplastic resin, such as acrylic resin, so that the light emitted from the stimulable phosphor plate 4 can be transmitted by total reflection through the light guiding sheet 5. The light guiding sheet may be of the shape and material as described in U.S. patent application Ser. No. 105,240.

As the photodetector 6, a photomultiplier having a spectroscopic sensitivity of S-11 type is preferably used. As shown in FIG. 3, on the light receiving face of the photodetector 6 is attached a filter 7 which has transmittance of 80% for the emitted light of 400 nm and 0.1% or less for the light of 633 nm. In this way, only the light having a wavelength within the range of 300 to 500 nm is detected by the photodetector 6. The output of the photodetector 6 is amplified by an amplifier 18 via a voltage conversion circuit 17, and sent to a reproduction unit.

In the optical path of the laser beam 2 emitted from the laser source 1, a semi-transparent mirror 9 is arranged to reflect a part 2a of the laser beam 2 toward a light amount controller 8, such as A/O modulator, through a lens 10. The light amount controller 8 controls the amount of light of the laser beam 2a by means of the standard signal S which is fed from a standard signal setting circuit 11 according to the radiographic conditions. The controlled amount of the laser beam is detected by an additional photodetector 12 for monitoring the amount of light of the laser beam, and the output of the additional photodetector 12 is amplified by an amplifier 13. The amplified signal is sent to a high voltage drive circuit 14 for the aforesaid photodetector 6 so as to adjust the high voltage source 15 of the photodetector 6.

In this way, the gain of the read out system is controlled according to fluctuations of the radiographic conditions and of the intensity of the stimulating ray source during the read out operation for the radiation image information which is stored in the stimulable phosphor plate 4.

In case the aforesaid standard signal S becomes an inappropriate value for some reasons, it is also possible to control the high voltage source 15 of the photodetector 6 by means of the predetermined constant standard voltage fed from the standard voltage setting circuit 16.

FIG. 4 shows the second embodiment of the present invention. In this figure, the same components are indicated by the same reference characters as those in FIG. 1 for simplicity of explanation. In this second embodiment of the present invention, the standard signal S is electrically mixed with the laser beam 2a for monitoring the amount of light of the laser beam. The output signal from the additional photodetector 12 for monitoring the amount of light of the laser beam is amplified by the amplifier 13 and sent to a mixing amplifier 19. On the other hand, the standard signal S from the standard signal setting circuit 11 is also sent to the mixing amplifier 19, where it is mixed with the signal from the amplifier 13. Thereafter, the output signal from the mixing amplifier 19 is fed to the high voltage drive circuit 14 so as to adjust the high voltage source 15 of the photodetector 6.

In this way, the gain of the read out system is controlled according to fluctuations of the radiographic conditions and of the intensity of the stimulating ray source during the read out operation of the radiation image information which is stored in the stimulable phosphor plate 4.

FIG. 5 illustrates the third embodiment of the present invention, in which the same components are indicated by the same reference characters as used in FIG. 1. In this third embodiment, the control of the read out gain according to a fluctuation in the intensity of the stimulating ray source is effected independently of the adjustment of read out gain according to a change in the radiographic conditions. The output from the additional photodetector 12 for monitoring the amount of light of the laser beam is compared, in a comparator 20, with the reference signal which is issued from the reference signal generator 21 to make the amount of light of the laser beam constant. The output from the comparator 20 is used to operate the light amount controller 8 such as A/O modulator, whereby the intensity of the laser beam 2 irradiated onto the stimulable phosphor plate 4 is controlled to a constant value.

On the other hand, to control the read out gain according to the radiographic conditions, the standard signal S issued from the standard signal setting circuit 11 is used to adjust the high voltage source 15 of the photodetector 6 through the high voltage drive circuit 14 of the photodetector 6.

In this way, the gain of the read out system is controlled according to fluctuations of the radiographic conditions and of the intensity of the stimulating ray source during the read out operation of the radiation image information which is stored in the stimulable phosphor plate 4.

All of the embodiments of the present invention shown in FIGS. 1, 4 and 5 can accomplish the purpose of the present invention, as described above. However, these embodiments involves the following problems concerning the practical use.

First, in the first and second embodiments shown in FIGS. 1 and 4 respectively, the read out gain is controlled by controlling the voltage of the high voltage source 15 of the photodetector 6 according to a fluctuation of the intensity of the stimulating ray source. However, it is very difficult to control the voltage of the high voltage source 15 at a high frequency. Thus, it is not always possible to conduct the control exactly following even a fine fluctuation of the intensity of the stimulating ray source, which will occur during the read out operation of the radiation image information.

Further, in these first and second embodiments, the control according to a fluctuation of the intensity of the stimulating rays and the control according to a change in the radiographic conditions are carried out simultaneously by the same means. Thus, it is difficult to conduct the control independently.

Moreover, in the first embodiment, the apparatus becomes complicated because the optical system is used to control according to a fluctuation of the intensity of the stimulating ray source and a change in the radiographic conditions.

In contrast with the two embodiments mentioned above, the third embodiment shown in FIG. 5 effects the adjustment of the intensity of the stimulating rays supplied to the stimulable phosphor plate 4. Therefore, with this embodiment, it is possible to compensate for the fluctuation of the intensity of the stimulating ray source, which occurs during the read out operation, thereby to make constant the intensity of the stimulating rays applied to the stimulable phosphor plate 4. It is also possible to advantageously conduct the control of the read out gain according to a fluctuation of the intensity of the stimulating ray source independently of the control according to a change in the radiographic conditions. This is because the independent means are used for respective items of control. However, to control the intensity of the stimulating rays to a constant value, the intensity thereof must inevitably be controlled to the minimum of the intensity of the stimulating ray source. Thus, the available intensity of the stimulating rays become small. As a result, the intensity of the intrinsically weak light emitted from the stimulable phosphor plate 4 becomes too low to allow read out of the radiation image information at a high sensitivity. In addition, the apparatus becomes complicated because the optical means is used to control according to a fluctuation of the intensity of the stimulating ray source.

FIG. 6 shows the fourth embodiment of the present invention, which solves also the above-mentioned problems of these embodiments.

In the fourth embodiment, a part of the stimulating rays is taken out and detected. The detected signal is sent to the amplifier 22 in order to control the gain (level) thereof. This amplifier 22 serves to amplify the output signal fed from the photodetector 6 which detects the light output from the stimulable phosphor plate 4. In addition, the standard signal S controls the gain of the high voltage source 15 of the aforesaid photodetector 6.

In the fourth embodiment shown in FIG. 6, the amplifier 22 is a variable-gain amplfier. The gain of this amplifier is controlled according to a fluctuation of the intensity of the stimulating ray source, whereby the level of the signal finally output is controlled to a value within a desired range. The gain of the amplifier 22 can be controlled at a high frequency and, therefore, sufficient control can be achieved even for fine fluctuations of the stimulating ray source. In addition, the control of the read out gain is conducted with the standard signal S according to the radiographic conditions independently of the control according to a fluctuation of the intensity of the stimulating ray source. Thus this embodiment is advantageous also in that both control items can be carried out independently of each other.

As the stimulable phosphor, those emit light at a wavelength within the range of 300 to 500 nm upon stimulation thereof are preferable according to the present invention. For example, rare earth activated alkaline earth metal fluorohalide phosphor is preferred. One example of this phosphor is, as shown in U.S. patent application Ser. No. 057,080, a phosphor represented by the formula $(Ba_{1-x-y}, Mg_x, Ca_y)FX:aEu^{2+}$ wherein X is at least one of Cl and Br, x and y are numbers satisfying $0 < x+y \leq 0.6$ and $xy \neq 0$, and a is a number satisfying $10^{-6} \leq a \leq 5 \times 10^{-2}$. Another example of this phosphor is, as shown in U.S. Pat. No. 4,239,968, a phosphor represented by the formula $(Ba_{1-x}, M^{II}_x)FX:yA$ wherein $M^{II}$ is at least one of Mg, Ca, Sr, Zn and Cd, X is at least one of Cl, Br and I, A is at least one of Eu, Tb, Ce, Tm Dy, Pr, Ho, Nd, Yb and Er, x is a number satisfying $0 \leq x \leq 0.6$, and y is a number satisfying $0 \leq y \leq 0.2$. Further, as the stimulable phosphor to be used in this invention can be used ZnS:Cu,Pb; $BaO.xAl_2O_3$:Eu wherein $0.8 \leq x \leq 10$; and $M^{II}O.xSiO_2$:A wherein $M^{II}$ is Mg, Ca, Sr, Zn, Cd or Ba, A is Ce, Tb, Eu, Tm, Pb, Tl, Bi or Mn, and x is a number satisfying $0.5 \leq x \leq 2.5$, as shown in U.S. Pat. No. 4,236,078. Furthermore, as the stimulable phosphor can be used LnOX:xA wherein Ln is at least one of La, Y, Gd and Lu, X is at least one of Cl and Br, A is at least one of Ce and Tb, x is a number satisfying $0 \leq x \leq 0.1$, as shown in U.S. Pat. No. 4,236,078. Among the above numerated phosphors, the rare earth activated alkaline earth metal fluorohalide phosphor is the most preferable, among which barium fluorohalides are the most preferable in view of the high intensity of emission of light.

Further, it is desirable to color the phosphor layer of the stimulable phosphor plate made of the above phosphor by use of pigments or dyes to improve the sharpness of the image obtained thereby as disclosed in U.S. patent application Ser. No. 156,520.

As the stimlating rays for reading out the radiation image stored in the stimulable phosphor plate is used a laser beam having high directivity. As the light source for the laser beam is preferred a laser source capable of emitting light having a wavelength within the range of 500 to 800 nm, preferably 600 to 700 nm, so that the beam can be separated from light emitted from the phosphor to provide an improved signal-to-noise ratio. For example, a He-Ne laser (633 nm) and a Kr laser (647 nm) can be used. Other light sources can be used if combined with a filter which cuts out the light of the wavelength of less than 500 nm and more than 800 nm.

In the context of the present invention, the standard signal S means the signal which is obtained by measuring light emitted from a stimulable phosphor plate or a phosphor provided along such a plate, when the plate is exposed to a radiation which transmits through an object. This measurement is, for example, conducted using a number of photoelectric converter elements located behind the stimulable phosphor plate. The obtained standard signal S is used to set the sensitivity level of the read out system. As the standard signal, for example, the maximum Smax of the signal, the minimum Smin and the average $\overline{S}$, or the logarithm thereof can be used. Further, it is also possible to use Smin as the standard signal S when (log Smax − log Smin) is less than a predetermined value, and to use $\overline{S}$ as the standard signal when (log Smax − log Smin) is more than the predetermined value.

It should be understood that the present invention is not limited to the embodiments described above, but various other modifications are also possible.

For example, instead of using only one light guiding sheet 5 as in the embodiments explained above, two light guiding sheets may be located symmetrically with respect to the scanning line on the stimulable phosphor plate 4. Further, when the supporting material of the stimulable phosphor plate 4 is transparent, one or more light guiding sheets may be located above the stimulable phosphor plate and another one or more light guiding sheets may be located below the stimulable phosphor plate 4.

In the embodiments described above, the control of the read out system according to a change in the radiographic conditions is carried out by changing the voltage applied to the photodetector 6. However, it is also possible to control the gain of the photodetector 6 by changing the bleeder resistance.

Moreover, the light deflector 3 may be any known devices such as polygon mirror, in addition to the galvanometer mirror. Similarly, any known photoelectric converters may be used as the photodetector 6, instead of the photomultiplier.

I claim:

1. In a radiation image information read out apparatus for scanning a stimulable phosphor plate, which carries radiation image information, with a light beam of stimulating rays to convert the radiation image information stored therein into light emitted according to the radiation image information and reading out the emitted light with a read out system including a photodetector, a device for controlling the radiation image information read out gain comprising an additional photodetector arranged separately from said photodetector, a means for introducing a part of said stimulating rays into said additional photodetector during the read out operation, a first gain controlling means for controlling the read out gain according to a fluctuation of the intensity of the stimulating ray source by controlling the gain of said read out system during the read out operation by means of the output from said additional photodetector, a means for generating the standard signal according to the radiographic conditions during a recording step for storing and recording said radiation image information, and a second gain controlling means for controlling the read out gain according to the radiographic conditions by controlling the gain of said read out system by means of said standard signal.

2. A device for controlling the radiation image information read out gain as defined in claim 1 wherein the photodetector of said read out system is a photomultiplier, and said additional gain controlling means controls the read out gain by changing the source voltage of said photomultiplier.

3. A device for controlling the radiation image information read out gain as defined in claim 2 wherein said first gain controlling means controls the read out gain by changing the source voltage of said photomultiplier.

4. A device for controlling the radiation image information read out gain as defined in claim 1 or 2 wherein said first gain controlling means controls the read out gain by changing the intensity of the stimulating rays.

5. A device for controlling the radiation image information read out gain as defined in claim 1 or 2 wherein said first gain controlling means controls the read out gain by changing the gain of the amplifier for amplifying the output of the photodetector of said read out system.

* * * * *